(12) United States Patent
Makisumi

(10) Patent No.: US 11,499,622 B2
(45) Date of Patent: Nov. 15, 2022

(54) SPEED REDUCER CASING, SPEED REDUCER, AND METHOD OF MANUFACTURING SPEED REDUCER CASING

(71) Applicant: Nabtesco Corporation, Tokyo (JP)

(72) Inventor: Kazuyoshi Makisumi, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/212,598

(22) Filed: Mar. 25, 2021

(65) Prior Publication Data

US 2021/0341044 A1 Nov. 4, 2021

(30) Foreign Application Priority Data

Apr. 30, 2020 (JP) .............................. JP2020-080574

(51) Int. Cl.
| | |
|---|---|
| *F16H 57/021* | (2012.01) |
| *F16H 55/10* | (2006.01) |
| *B29C 45/14* | (2006.01) |
| *F16H 1/32* | (2006.01) |
| *F16H 57/032* | (2012.01) |
| *B29L 31/00* | (2006.01) |

(52) U.S. Cl.
CPC ............ *F16H 57/021* (2013.01); *B29C 45/14* (2013.01); *F16H 1/32* (2013.01); *F16H 55/10* (2013.01); *F16H 57/032* (2013.01); *B29L 2031/749* (2013.01)

(58) Field of Classification Search
CPC ........ F16H 57/021; F16H 57/032; F16H 1/32; F16H 55/10
See application file for complete search history.

(56) References Cited

U.S. PATENT DOCUMENTS

| | | | |
|---|---|---|---|
| 7,361,118 B2* | 4/2008 | Ando | ................. F16H 55/0806 |
| | | | 74/438 |
| 2010/0113206 A1* | 5/2010 | Wang | ................... F16H 1/2818 |
| | | | 475/180 |

FOREIGN PATENT DOCUMENTS

JP 2016-109264 A 6/2016

* cited by examiner

*Primary Examiner* — Huan Le
(74) *Attorney, Agent, or Firm* — Pillsbury Winthrop Shaw Pittman, LLP

(57) ABSTRACT

A speed reducer casing of the present invention has inner teeth on an inner periphery thereof. The speed reducer casing includes an inner tooth portion and a casing body portion, the inner tooth portion including the inner teeth, the casing body portion supporting the inner tooth portion. The inner tooth portion is formed of a material having a higher slidability than the casing body portion. The casing body portion is formed of a material having a higher hardness than the inner tooth portion.

14 Claims, 2 Drawing Sheets

SPEED REDUCER CASING, SPEED REDUCER, AND METHOD OF MANUFACTURING SPEED REDUCER CASING

CROSS-REFERENCE TO RELATED APPLICATIONS

This application is based on and claims the benefit of priority from Japanese Patent Application Serial No. 2020-080574 (filed on Apr. 30, 2020), the contents of which are hereby incorporated by reference in their entirety.

TECHNICAL FIELD

The present invention relates to a speed reducer casing, a speed reducer, and a method of manufacturing the speed reducer casing.

BACKGROUND

Industrial robots, machine tools and the like may include a speed reducer to reduce the speed of rotation of a rotary drive source such as a motor (see, for example, Japanese Patent Application Publication No. 2016-109264 ("the '264 Publication")).

In the speed reducer of the '264 Publication, a plurality of pin grooves that form inner teeth are provided on the inner peripheral side of a speed reducer casing having a cylindrical shape, and each of the pin grooves slidably retains a columnar inner tooth pin. The outer teeth of a speed reduction mechanism housed in the speed reducer casing mesh with the plurality of inner tooth pins, such that the speed reduction mechanism decelerates the input rotation and transmits the rotation to the output side as required. The pin grooves (inner teeth) provided on the inner peripheral side of the speed reducer casing are formed integrally with the inner peripheral surface of the speed reducer casing.

In the above speed reducer casing, the pin grooves (inner teeth) are formed integrally with the inner peripheral surface of the speed reducer casing, and therefore, if the entirety of the casing is formed of an aluminum alloy or the like for improving the strength of the casing, the slidability of the pin grooves (inner teeth) is degraded. On the other hand, if the entirety of the casing is formed of an engineering plastic or the like for improving the slidability of the pin grooves (inner teeth), it is difficult to maintain a sufficiently high strength of the entirety of the casing.

SUMMARY

The present invention provides a speed reducer casing, a speed reducer, and a method of manufacturing the speed reducer casing capable of minimizing the reduction of strength of the entirety and improving the slidability of the inner teeth.

A speed reducer casing according to one aspect of the present invention is a speed reducer casing having inner teeth on an inner periphery thereof, the speed reducer casing comprising: an inner tooth portion including the inner teeth; and a casing body portion supporting the inner tooth portion, wherein the inner tooth portion is formed of a material having a higher slidability than the casing body portion, and wherein the casing body portion is formed of a material having a higher hardness than the inner tooth portion.

The casing body portion may be formed of a material having a higher melting point than the inner tooth portion.

The casing body portion preferably has such a tubular shape as to cover at least a radially outer region of the inner tooth portion.

The inner teeth of the inner tooth portion may be formed of pin grooves retaining therein columnar inner tooth pins so as to be slidable.

A speed reducer according to one aspect of the present invention comprises: any one of the above speed reducer casings; and a speed reduction mechanism disposed inside the speed reducer casing.

A method of manufacturing a speed reducer casing according to one aspect of the present invention is a method of manufacturing a speed reducer casing having inner teeth on an inner periphery thereof. The speed reducer casing includes an inner tooth portion and a casing body portion, the inner tooth portion including the inner teeth, the casing body portion supporting the inner tooth portion. The inner tooth portion is formed of a material having a higher slidability than the casing body portion. The casing body portion is formed of a material having a higher hardness than the inner tooth portion. The method of manufacturing a speed reducer casing comprises: forming the casing body portion first; and setting the casing body portion in a mold and forming the inner tooth portion by injection molding.

Advantageous Effects

In a speed reducer casing according to one aspect of the present invention, the casing body portion can ensure the strength of the entire speed reducer casing, and the inner tooth portion can ensure the slidability of the inner teeth. The speed reducer casing according to one aspect of the present invention is thus capable of minimizing the reduction of the strength of the entire speed reducer casing and improving the slidability of the inner teeth.

DESCRIPTION OF THE EMBODIMENTS

Figure 1:
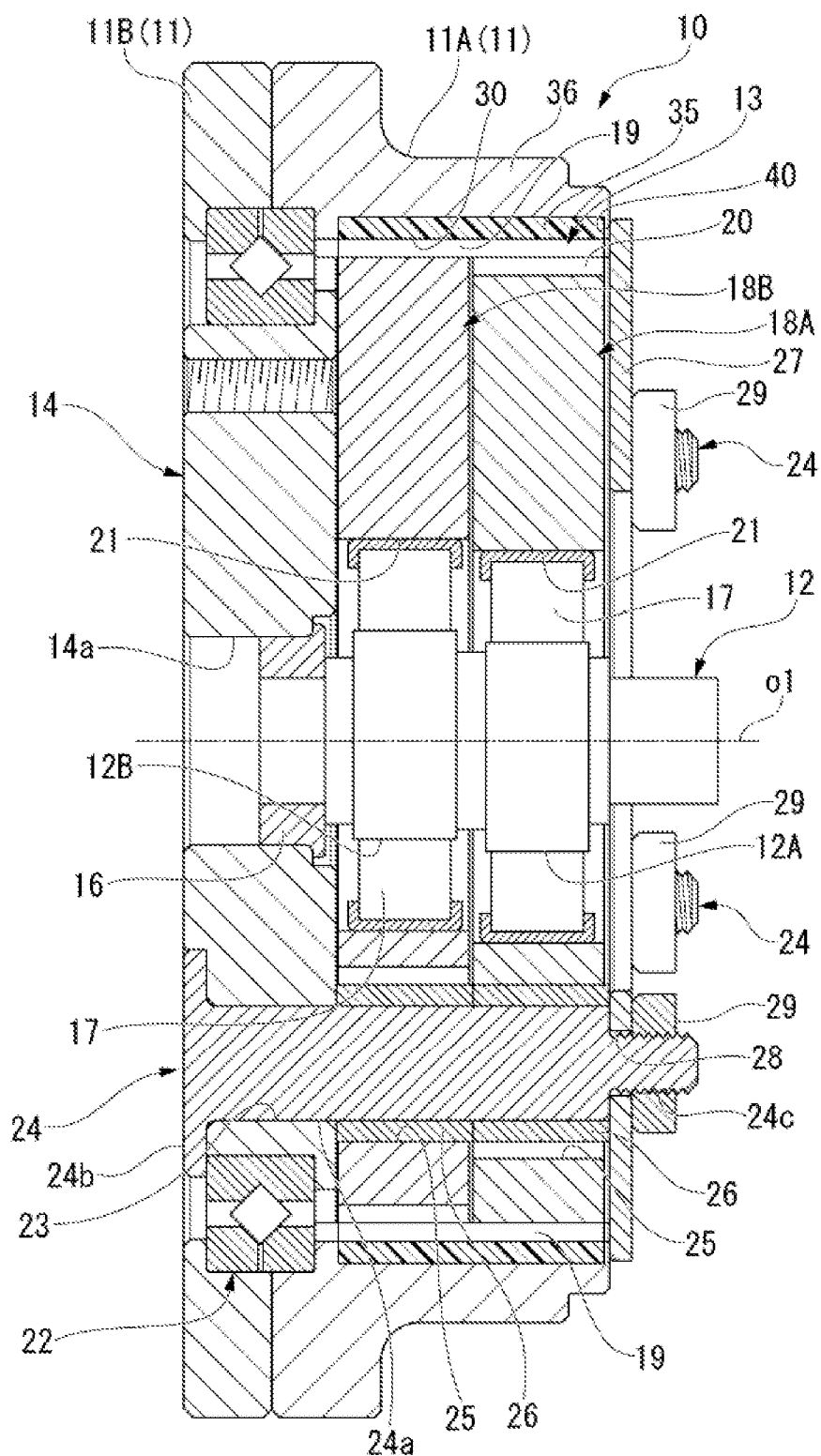
FIG. 1 is a longitudinal sectional view of a speed reducer according to an embodiment.

The embodiment of the present invention will be hereinafter described with reference to the drawings. FIG. 1 is a longitudinal sectional view of a speed reducer 10 according to the embodiment. The speed reducer 10 of the embodiment is used in, for example, a movable joint portion of an industrial robot along with a rotary drive source such as a motor. The rotary drive source (not shown) is connected to the input side of the speed reducer 10.

The speed reducer 10 includes: a speed reducer casing 11 having a substantially cylindrical shape; an input shaft 12 rotatably positioned at the axis of the speed reducer casing 11; a speed reduction mechanism 13 for decelerating the rotation of the input shaft 12; and an output rotator 14 for outputting rotation decelerated by the speed reduction mechanism 13.

The speed reducer casing 11 includes: a main casing 11A mounted to a movable joint portion of a robot or the like; and an end block 11B having an annular shape and fastened with a bolt to one axial end surface of the main casing 11A.

The input shaft 12 is connected at one axial end side thereof to the rotary drive source (not shown) and is rotatably supported at the other axial end side thereof on an axial hole 14a of the output rotator 14 via a bearing 16. The input shaft 12 includes a pair of eccentric portions 12A, 12B that are positioned in an axially middle region of the input shaft 12 and radially eccentric to the center axis o1 of the input shaft 12. The pair of eccentric portions 12A, 12B are positioned eccentrically so as to be out of phase with each other by 180° around the center axis o1. Each of the eccentric portions 12A, 12B has a circular sectional shape and has an eccentric portion bearing 17 mounted to the outer peripheral surface thereof.

The speed reduction mechanism 13 includes: a first oscillating gear 18A and a second oscillating gear 18B each having outer teeth 20 on the outer periphery thereof and configured to oscillate and rotate (revolve) in accordance with the rotation of the input shaft 12; pin grooves 30 formed as inner teeth on the inner periphery of the main casing 11A; and a plurality of inner tooth pins 19 retained in the pin grooves 30. The pin grooves 30 are constituted by, for example, involute teeth. Each of the inner tooth pins 19 is retained in the pin groove 30 on the inner periphery of the main casing 11A so as to be parallel to the center axis o1 and rollable. The first oscillating gear 18A and the second oscillating gear 18B have an outer diameter slightly smaller than the inner diameter of the speed reducer casing 11. The respective numbers of the outer teeth 20 formed on the outer peripheral surfaces of the first oscillating gear 18A and the second oscillating gear 18B are slightly smaller than the number of the inner tooth pins 19 (by one, for example).

Each of the first oscillating gear 18A and the second oscillating gear 18B has a through-hole 21 formed in the central portion thereof and having a predetermined inner diameter. The through-holes 21 have the eccentric portion bearings 17 fitted therein, and the eccentric portion bearings 17 are mounted to the eccentric portions 12A, 12B of the input shaft 12. The first oscillating gear 18A and the second oscillating gear 18B are rotatably supported on the eccentric portions 12A, 12B of the input shaft 12, respectively, via the eccentric portion bearings 17.

When the input shaft 12 receives a drive force from the rotary drive source (not shown) and rotates, the eccentric portions 12A, 12B of the input shaft 12 oscillate and rotate (revolve) at a predetermined radius in the same direction, such that the first oscillating gear 18A and the second oscillating gear 18B oscillate and rotate (revolve) at the same radius in the same direction. Simultaneously, the outer teeth 20 of the first oscillating gear 18A and the second oscillating gear 18B contact and mesh with the plurality of inner tooth pins 19 on the inner periphery of the main casing 11A. In the speed reduction mechanism 13 of the embodiment, the respective numbers of the outer teeth 20 of the first oscillating gear 18A and the second oscillating gear 18B are slightly smaller than the number of the inner tooth pins 19 on the main casing 11A side. Therefore, during one oscillating rotation (one revolution) of the first oscillating gear 18A and the second oscillating gear 18B, the first oscillating gear 18A and the second oscillating gear 18B receive a reaction force in a rotational direction imparted from the inner tooth pins 19 on the main casing 11A side and spin by a predetermined pitch in a direction counter to the direction of the oscillating rotation (the direction of the revolution). Accordingly, in the speed reduction mechanism 13 of the embodiment, the rotation of the input shaft 12 is decelerated at a predetermined reduction ratio and causes the spin of the first oscillating gear 18A and the second oscillating gear 18B.

The output rotator 14 has a short-axis cylindrical shape and includes an axial hole 14a in the central portion thereof. The output rotator 14 is positioned adjacent to the second oscillating gear 18B in the speed reducer casing 11. The output rotator 14 is, for example, rotatably supported on the speed reducer casing 11 via a bearing 22 such as a cross roller bearing.

A plurality of pin fit-in holes 23 are formed in the outer peripheral edge of the output rotator 14 at regular intervals in the circumferential direction. The plurality of pin fit-in holes 23 are positioned concentrically around the axis of the output rotator 14 (the center axis o1 of the input shaft 12). Each pin fit-in hole 23 extends through the output rotator 14 in parallel with the axis of the output rotator 14 (the center axis o1 of the input shaft 12). Each pin fit-in hole 23 receives therein a rotation transmitting pin 24 for transmitting the spin of the first oscillating gear 18A and the second oscillating gear 18B to the output rotator 14. The rotation transmitting pin 24 includes: a shaft portion 24a having a substantially uniform outer diameter; a flange portion 24b extending radially outward from one axial end side of the shaft portion 24a; and a male screw portion 24c projecting from the other axial end side of the shaft portion 24a coaxially with the shaft portion 24a. The male screw portion 24c has a smaller diameter than the shaft portion 24a and has a male thread in the outer peripheral surface thereof.

Each of the first oscillating gear 18A and the second oscillating gear 18B has rotation transmitting holes 25 at positions corresponding to the pin fit-in holes 23, and the rotation transmitting holes 25 have a larger inner diameter than the pin fit-in holes 23. The rotation transmitting holes 25 of the first oscillating gear 18A and the second oscillating gear 18B are penetrated by the shaft portion 24a of the corresponding rotation transmitting pin 24. The shaft portion 24a of the rotation transmitting pin 24 is arranged such that its proximal portion is fitted in the pin fit-in hole 23 of the output rotator 14, and its distal portion penetrates the rotation transmitting holes 25 of the first oscillating gear 18A and the second oscillating gear 18B. On the outer peripheral surface of the distal portion of the shaft portion 24a, there are fitted a pair of slide rings 26 having an outer peripheral surface with a small frictional resistance. The slide rings 26 slide on the inner surface of the corresponding rotation transmitting hole 25 during the oscillating rotation (revolution) and the spin of the first oscillating gear 18A and the second oscillating gear 18B described above. In this way, the rotational force of the spin of the first oscillating gear 18A and the second oscillating gear 18B is transmitted to the rotation transmitting pin 24. The rotational force transmitted to the rotation transmitting pin 24 is transmitted to the output rotator 14 that retains the one axial end side of the rotation transmitting pin 24.

On the axial end of the speed reducer 10 opposite to the output rotator 14, there is disposed an end plate 27 having an annular shape. The end plate 27 has a plurality of penetration holes 28 formed therein. Each penetration hole 28 is penetrated by the male screw portion 24c of the rotation transmitting pin 24 projecting from the rotation transmitting hole 25 of the first oscillating gear 18A. A fastening nut 29 is screwed on the distal portion of the male screw portion 24c projecting from the penetration hole 28. In this way, the end plate 27 is fastened integrally to the respective end portions of the plurality of rotation transmitting pins 24. Accordingly, the end plate 27 rotates integrally with the output rotator 14 constantly.

Figure 2:
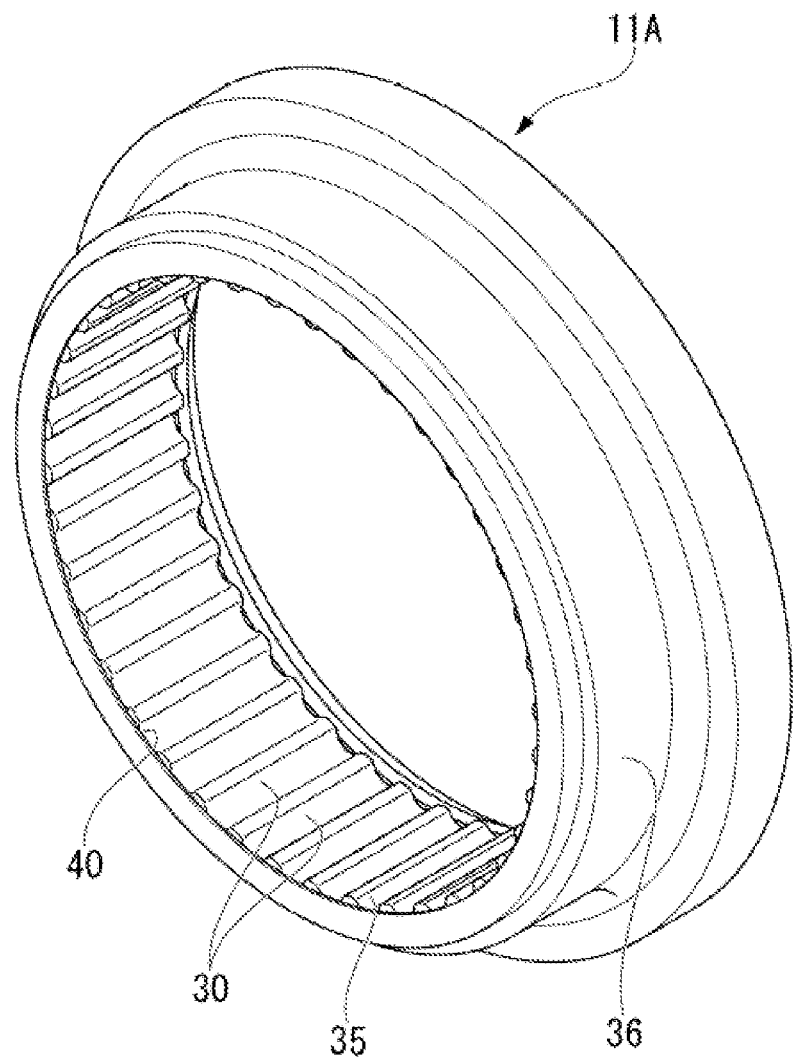
FIG. 2 is a perspective view of a speed reducer casing according to the embodiment.

FIG. 2 is a perspective view of the main casing 11A of the speed reducer casing 11. The main casing 11A includes an inner tooth portion 35 and a casing body portion 36. The inner tooth portion 35 has a substantially cylindrical shape and includes a plurality of pin grooves on the inner peripheral side thereof, and the casing body portion 36 supports the inner tooth portion 35 externally. The casing body portion 36 has such a tubular shape as to cover a radially outer region and axially opposite side portions of the inner tooth portion 35. The casing body portion 36 is formed of, for example, a light metal having a high specific strength such as aluminum alloys. The inner tooth portion 35 is formed of a hard resin such as engineering plastics having a high surface slidability. The inner tooth portion 35 is formed of a material having a higher slidability than the casing body portion 36, and the casing body portion 36 is formed of a material having a higher hardness than the inner tooth portion 35. Further, the casing body portion 36 is formed of a material having a higher melting point than the material forming the inner tooth portion 35.

As shown in FIG. 1, an annular groove 40 having a predetermined axial width is formed on the inner peripheral side of the casing body portion 36. The inner tooth portion 35 is positioned in the annular groove 40 of the casing body portion 36 such that the plurality of pin grooves 30 are exposed toward the inner peripheral side.

The main casing 11A can be manufactured, for example, in the following manner. The casing body portion 36 is first formed by casting of a light metal having a high specific strength. Next, the casing body portion 36 is set in a mold, and a hard resin is injected into the mold to form the inner tooth portion 35. At this time, the pin grooves 30 of the inner tooth portion 35 are formed by the inner surface of the mold, and the hard resin injected is filled tightly into the annular groove 40 of the casing body portion 36. The product is then taken out of the mold after the hard resin is cured. In the product taken out, the inner tooth portion 35 is integrated with the casing body portion 36, and the pin grooves 30 of the inner tooth portion 35 have a smooth injection-molded surface. The resin for forming the inner tooth portion 35 may be a fiber-reinforced resin.

The end block 11B of the speed reducer casing 11, which has no pin groove 30, is formed by casting of a light metal having a high specific strength such as aluminum alloys. The casing body portion 36 and the end block 11B of the main casing 11A are worked into shape by cutting or the like.

As described above, in the speed reducer casing 11 of the embodiment, the inner tooth portion 35 is formed of a material having a higher slidability than the casing body portion 36, and the casing body portion 36 is formed of a material having a higher hardness than the inner tooth portion 35. Therefore, the casing body portion 36 can ensure the strength of the entire speed reducer casing 11, and the inner tooth portion 35 can improve the slidability of the pin grooves 30 (inner teeth). The speed reducer casing 11 of the embodiment is thus capable of minimizing the reduction of the strength of the speed reducer casing 11 and improving the slidability of the pin grooves 30.

Further, in the speed reducer casing 11 of the embodiment, the casing body portion 36 is formed of a material having a higher melting point than the inner tooth portion 35. Therefore, when the casing body portion 36 previously formed is set in a mold, and a resin for forming the inner tooth portion is injected into this mold, it can be prevented that the casing body portion 36 is deformed by the heat of the molten resin. It is thus possible to stabilize the shape of the casing body portion 36 and ensure the strength of the speed reducer casing 11.

Further, in the speed reducer casing 11 of the embodiment, the casing body portion 36 has such a tubular shape as to cover a radially outer region of the inner tooth portion 35. Therefore, when a large torque is imparted from the first oscillating gear 18A and the second oscillating gear 18B to the inner peripheral side of the inner tooth portion 35, the casing body portion 36 having a tubular shape and having a high strength restricts the deformation of the inner tooth portion 35 in the expanding direction (the radially outward direction). The speed reducer casing 11 of the embodiment is thus capable of maintaining a high accuracy of the speed reducer 10 in reducing the speed.

In the speed reducer casing 11 of the embodiment, the inner tooth pins 19 each having a columnar shape are slidably retained in the pin grooves 30 of the inner tooth portion 35. It is thus possible to maintain a high slidability of the pin grooves 30 and the inner tooth pins and improve the accuracy of the speed reducer 10 in reducing the speed.

In the above-described method of manufacturing the speed reducer casing, the casing body portion 36 is first formed, then the casing body portion 36 is set in a mold, and the inner tooth portion 35 is formed by injection molding. Therefore, with this manufacturing method, the inner tooth portion 35 can be integrated tightly with the casing body portion 36, and the pin grooves 30 (inner tooth) of the inner tooth portion 35 can have a smooth injection-molded surface that contacts with the mold.

The present invention is not limited to the above-described embodiments but is susceptible of various design modification within the purport of the present invention. For example, in the above embodiment, the speed reducer casing 11 is constituted by two components, the main casing 11A and the end block 11B, but the speed reducer casing may be constituted by one component or three or more components. Further, the materials forming the inner tooth portion 35 and the casing body portion 36 are not limited to the described examples. For example, the casing body portion 36 may be formed of an iron-based metal or a resin.

What is claimed is:

1. A speed reducer casing having inner teeth on an inner periphery thereof, the speed reducer casing comprising:
    an inner tooth portion including the inner teeth; and
    a casing body portion supporting the inner tooth portion,
    wherein a material forming the inner tooth portion is different from a material forming the casing body portion,
    the material forming the inner tooth portion has a higher slidability than the material forming the casing body portion, and
    wherein the material forming the casing body portion has a higher hardness than the material forming the inner tooth portion.

2. The speed reducer casing of claim 1, wherein the casing body portion is formed of a material having a higher melting point than the inner tooth portion.

3. The speed reducer casing of claim 1, wherein the casing body portion has such a tubular shape as to cover at least a radially outer region of the inner tooth portion.

4. The speed reducer casing of claim 3, wherein the inner teeth of the inner tooth portion are formed of pin grooves retaining therein columnar inner tooth pins so as to be slidable.

5. A speed reducer comprising:
    the speed reducer casing of claim 1; and
    a speed reduction mechanism disposed inside the speed reducer casing.

6. The speed reducer casing of claim 1,
wherein the casing body portion is formed of a light metal having a high specific strength.

7. The speed reducer casing of claim 6,
wherein the casing body portion is formed of an aluminum alloy.

8. The speed reducer casing of claim 6,
wherein the inner tooth portion is formed of a hard resin.

9. The speed reducer casing of claim 8,
wherein the inner tooth portion is formed of an engineering plastic.

10. The speed reducer casing of claim 7,
wherein the inner tooth portion is formed of a hard resin.

11. The speed reducer casing of claim 10,
wherein the inner tooth portion is formed of an engineering plastic.

12. The speed reducer casing of claim 1,
wherein the inner tooth portion is formed of a hard resin.

13. The speed reducer casing of claim 12,
wherein the inner tooth portion is formed of an engineering plastic.

14. A method of manufacturing a speed reducer casing having inner teeth on an inner periphery thereof,
wherein the speed reducer casing includes an inner tooth portion and a casing body portion, the inner tooth portion including the inner teeth, the casing body portion supporting the inner tooth portion, a material forming the inner tooth portion being different from a material forming the casing body portion, the material forming the inner tooth portion having a higher slidability than the material forming the casing body portion, and the material forming the casing body portion having a higher hardness than the material forming the inner tooth portion,
the method comprises:
forming the casing body portion first; and
setting the casing body portion in a mold and forming the inner tooth portion by injection molding.

* * * * *